(12) United States Patent
Zhang et al.

(10) Patent No.: US 8,775,377 B1
(45) Date of Patent: Jul. 8, 2014

(54) EFFICIENT DATA BACKUP WITH CHANGE TRACKING

(75) Inventors: Shuangmin Zhang, Beijing (CN);
Xianbo Zhang, Plymouth, MN (US);
Weibao Wu, Vadnais Heights, MN (US);
Jim R. Lamb, Maplewood, MN (US);
Yun Yang, Beijing (CN); Satyajit Ashok GorheParlikar, Shoreview, MN (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/557,558

(22) Filed: Jul. 25, 2012

(51) Int. Cl.
*G06F 17/30* (2006.01)
*G06F 17/00* (2006.01)

(52) U.S. Cl.
CPC ..................... *G06F 17/00* (2013.01)
USPC ........... 707/640; 707/661; 707/674; 707/610; 707/791

(58) Field of Classification Search
CPC ................ G06F 17/00; G06F 17/30
USPC ................................................. 707/600–899
See application file for complete search history.

(56) References Cited

U.S. PATENT DOCUMENTS

2011/0113012 A1* 5/2011 Gruhl et al. .................. 707/646

* cited by examiner

*Primary Examiner* — Isaac M Woo
*(74) Attorney, Agent, or Firm* — Campbell Stephenson LLP

(57) ABSTRACT

The present disclosure provides for efficiently creating a full backup image of a client device by efficiently communicating backup data to a backup server using a change tracking log, or track log. A present full backup image can be created using a track log that is associated with a previous full backup image. The client device can determine whether files, which were included in the previous full backup image, have or have not changed using the track log. The client device can transmit changed file data to the backup server for inclusion in the present full backup image. The client device can also transmit metadata identifying unchanged file data to the backup server. The backup server can use the metadata to extract a copy of the unchanged file data from the previous full backup image for inclusion in the present full backup image.

20 Claims, 12 Drawing Sheets

Track Log 130

Header: 310  Backup ID = user01_Backup0001  315

| | Block Start 320 | Block Count 330 | Change Time 340 | Modify Time 350 | Path 360 | Fingerprint 370 |
|---|---|---|---|---|---|---|
| Log Entry for t1 380(1) | 0 | 10 | 1321143737 | 1321143737 | /Storage/data/t1 | 43FD765F |
| Log Entry for t2 380(2) | 11 | 20 | 1321144994 | 1321144994 | /Storage/data/t2 | 23A35413 |
| Log Entry for t3 380(3) | 21 | 35 | 1321144994 | 1321144994 | /Storage/data/t3 | 34C1DF03 |
| Log Entry for t4 380(4) | 36 | 49 | 1321143737 | 1321143737 | /Storage/data/t4 | 41FE3999 |
| Log Entry for t5 380(5) | 50 | 65 | 1321143737 | 1321143737 | /Storage/data/t5 | 8239301A |

FIG. 3

EFFICIENT DATA BACKUP WITH CHANGE TRACKING

FIELD OF THE INVENTION

The present invention relates to performing backup operations and, more particularly, to efficiently performing full backup operations.

DESCRIPTION OF THE RELATED ART

An ever-increasing reliance on information and computing systems that produce, process, distribute, and maintain such information in its various forms, continues to put great demands on techniques for providing data storage and access to that data storage. Business organizations can produce and retain large amounts of data. While data growth is not new, the pace of data growth has become more rapid, the location of data more dispersed, and linkages between data sets more complex. Creating backup images of such data requires a significant amount of network resources.

BRIEF DESCRIPTION OF THE DRAWINGS

The present invention may be better understood, and its numerous objects, features and advantages made apparent to those skilled in the art by referencing the accompanying drawings.

FIG. 3 is a simplified block diagram illustrating components of an example track log, according to one embodiment.

Figure 1:
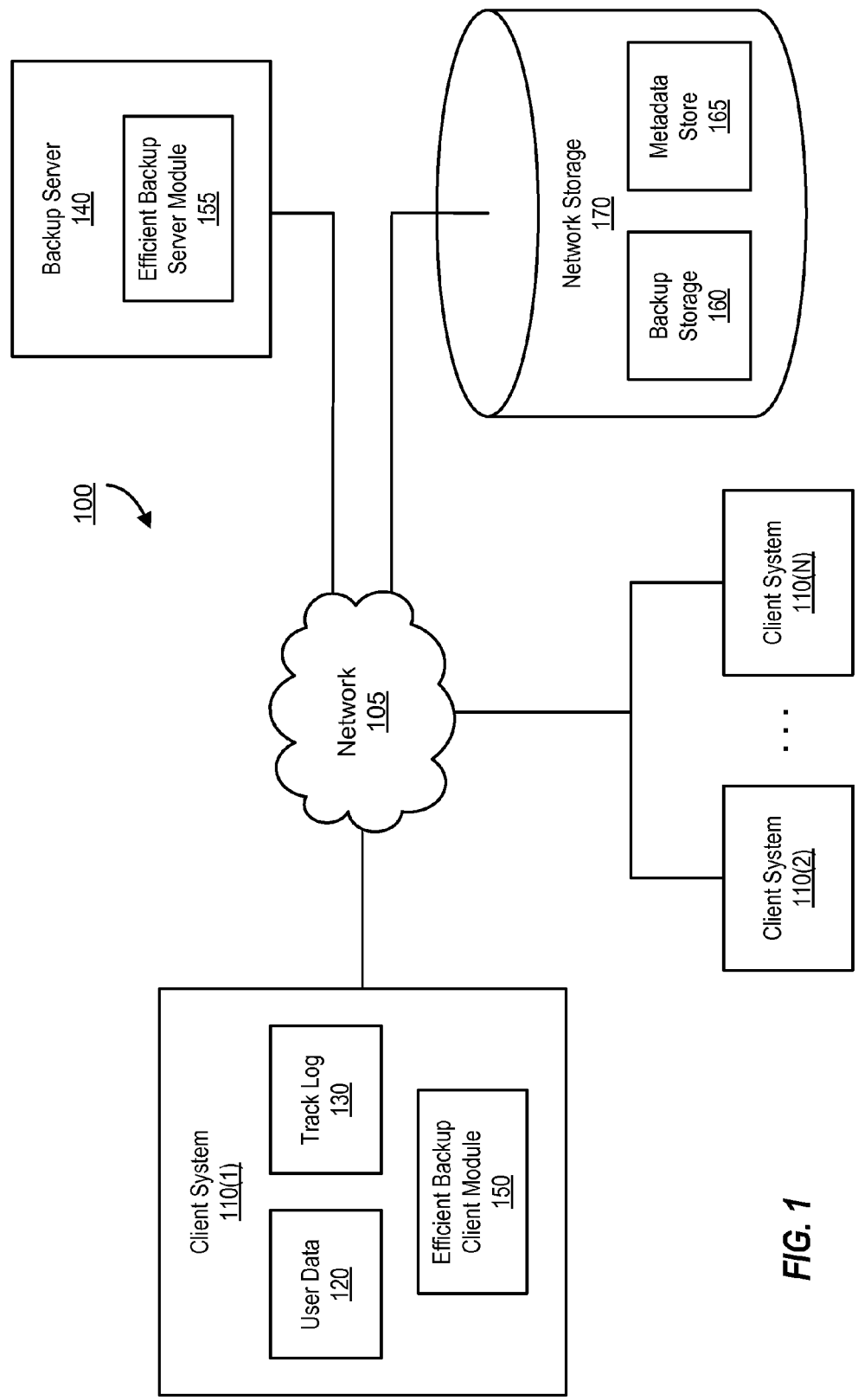
FIG. 1 is a simplified block diagram illustrating components of an example backup system in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

Overview

When performing a traditional full backup process of a client device, files of the client device are transmitted to a backup server. The backup server includes the files of the client device in a full backup image (also referred to herein as a full backup), and stores the full backup image in backup storage. Each time a subsequent full backup image is created for the client device, the client files are again transmitted to the backup server, even if the client files have not changed since the time of the last full backup. Thus, creating a traditional full backup of a client device can take up a significant amount of network bandwidth and client I/O each time the full backup operation is performed. Further, creating a traditional full backup image can also take up a significant amount of the backup server's local storage and processing bandwidth as the client files are received from the client and are written as the full backup image to dedicated backup storage.

The present disclosure provides for efficiently creating a full backup image (also referred to herein as a full backup) of a client device by efficiently communicating backup data to a backup server using a change tracking log (also referred to herein as a track log). A present full backup image can be created during an efficient full backup process that uses a track log associated with a previous backup image. The previous backup image can be created using either a traditional full backup process or the efficient full backup process (discussed in further detail below). The track log contains file attributes of the files that are included in the previous backup image, where the file attributes were captured at the time the previous backup image was created. In another embodiment, the track log can contain segment attributes of the files included in the previous backup image, where each of the files can be divided into segments, and the segment attributes were captured at the time the previous backup image was created. A file can be divided into one or more file segments (or portions) that include one or more file blocks, where the file blocks can be fixed-size or variable-sized blocks.

The track log can be used to determine whether file data (e.g., files or file segments) included in the previous backup image has or has not changed since the time the previous backup image was created. The client device can transmit changed file data (which can include entire changed files or changed file segments) to a backup server for inclusion in the present full backup image. The client device can also generate a header for the changed file data, also referred to herein as a data header. The client device can transmit the data header and associated changed file data to the backup server via, for example, a tar stream (e.g., transmit a data header with an entire file or with a changed file segment).

Since the unchanged file data has not changed since the previous backup image, the previous backup image can be used as a base backup image from which the unchanged file data can be extracted. Thus, rather than transmitting unchanged file data (which can include entire unchanged files or unchanged file segments) to the backup server, the client device can instead transmit metadata that identifies the unchanged file data in the previous backup image. The metadata can be extracted by the client device from the track log associated with the previous backup image. Such metadata can include file attributes of entire files, or segment attributes of the unchanged file segments. The client device can generate a special header for the metadata, also referred to as a metadata header. The metadata can be included in the metadata header and transmitted to the backup server (e.g., via the tar stream). The backup server can use the metadata transmitted from the client device to extract the unchanged file data from the base backup image (e.g., the previous backup image) and include the unchanged file data in the present full backup image.

As the present full backup image is being generated (e.g., as changed file data and metadata is transmitted to the backup server for inclusion in the present full backup image), the client device also generates a new track log that is associated with the present full backup image. The new track log contains file attributes of the files included in the present full backup image, where the file attributes are captured as the present full backup image is created. In another embodiment, the new track log can contain segment attributes of the file segments included in the present full backup image, where the segment attributes are captured as the present full backup image is created. Once the present full backup image is complete, the new track log can be used for a future backup image to determine whether file data (e.g., entire files or file segments) has or has not changed since the time the present full backup image was created. Optionally, the new track log can overwrite the previous track log.

Especially in cases where little client file data has changed (e.g., most client files are unchanged), the metadata is a much smaller amount of data compared to the unchanged file data that is identified by the metadata, and thus the overall amount of backup data transmitted to the backup server is reduced. In other words, the changed file data and metadata is a smaller amount of backup data as compared to both changed and unchanged file data traditionally sent to the backup server. Thus, the present disclosure provides for reducing the amount of network bandwidth, client I/O, and other computing resources needed to transmit a smaller amount of backup data to the backup server. Also, the present disclosure provides for reducing the amount of local storage and processing bandwidth of the backup server needed to receive a smaller amount of backup data.

Example Embodiments

FIG. 1 is a simplified block diagram illustrating components of an example backup system 100, in which the present disclosure can be implemented. Backup system 100 includes a network 105 that communicatively couples one or more client systems 110(1)-(N), a backup server 140, and network storage 170. Each component is discussed in further detail below.

One or more client systems 110(1)-(N), also referred to herein as client devices 110 and/or clients 110, can be implemented using, for example, a desktop computer, a laptop computer, a workstation, a server, or the like. An example of such computing devices is described subsequently, in connection with FIG. 8. One or more clients 110(1)-(N) can be configured to communicate with backup server 140 via network 105. An example of network 105, which can be used by clients 110(1)-(N) to access backup server 140, is a local area network (LAN) utilizing Ethernet, IEEE 802.11x, or some other communications protocol. While FIG. 1 illustrates client system 110(1) including user data 120 and track log 130, each client system can store different user data 120 and track log 130 in storage local to the client system.

User data 120 can include various data that is generated and/or consumed by applications employed by a user of client system 110(1). User data 120 can also include executable files, such as those used to implement applications and operating systems, as well as files that are used or generated by such executable files. User data 120 can include files generated by user applications (e.g., word processing programs, email programs, graphics programs, a database application, or the like) executing on client 110(1). Some of user data 120 may also be transferred to backup server 130 via a network 105 to be included in backup storage 160 (e.g., stored as part of a backup image in backup storage 160). Each client 110 can send different user data 120 to backup server 140.

Backup server 140 is also coupled to network 105. Backup server 140 can include one or more physical servers (e.g., one or more media servers) configured to perform a variety of tasks related to management and implementation of backup services for backup system 100, such as performing a full or partial backup of a client system. In the system illustrated in FIG. 1, backup server 140 is further configured to communicate with backup storage 160 and metadata store 165 for purposes of storing backup data of client systems 110(1)-(N) in resources controlled by backup server 140 (e.g., in a storage device controlled by a media server, which are both controlled by backup server 140). Backup storage 160 is a storage area in which backup data (e.g., backup images) can be stored. Metadata store 165 is a storage area in which metadata about backup data can be stored (e.g., a central index that includes backup image identifications, locations of backup images, lists of files included in backup images, fingerprints of files, and the like). Backup server 140 can communicate with backup storage 160 via network 105 or via a direct link between the backup server 140 and backup storage 160 (not shown).

Backup storage 160 and metadata store 165 can be stored in network storage 170. Network storage 170 can be implemented as network attached storage (NAS), file servers, storage filers, and/or network shares. Network storage 170 can be implemented as a single storage device or as a collection of storage devices. Network storage 170 can also be implemented as a storage area network (SAN), which couples remote storage devices to a server (e.g., a storage server), such that the remote storage devices appear as locally-attached storage devices to the server's OS, for example. Network storage 170 can include a data volume.

Backup services can be implemented in backup system 100 as a client-server application (not shown), with a server component (e.g., residing on backup server 140) and a client component (e.g., residing on client 110) of the client-server application. A server component can be configured to communicate with a client component during a backup process. Certain functions of the backup services can be performed by the client and server components, where the functions may be divided between the two components, or may be performed completely by one component or the other, depending on the implementation of the backup application. For example, backup server 140 can be configured to perform tasks that include communicating with clients 110 to initiate backup tasks on the clients, maintaining databases related to files and other information backed up from file systems associated with the clients, and managing or tracking resources storing backups of clients 110.

Embodiments of the present disclosure can be implemented in an efficient backup client module 150 and an efficient backup server module 155, which can cooperatively implement an efficient full backup process. An efficient backup client module 150 (also referred to herein as client module 150) can be implemented in one or more client systems 110, and an efficient backup server module 155 (also referred to herein as server module 155) can be implemented in backup server 140. Client module 150 and server module 155 can be configured to implement an efficient full backup process that uses track log 130 associated with a previous backup image to create a present full backup image. During an efficient backup process to backup user data 120 in a present backup image, client module 150 can use track log 130 to determine whether user data 120 has or has not changed since the previous full backup image was created. Client module 150 can communicate the changed user data (which can include entire files or file segments) to server module 155 for inclusion in the present full backup image. Client module 150 can also communicate metadata to server module 155, where the metadata identifies unchanged user data (which can include entire files or file segments) that is included in a previous full backup image of the client 110. Server module 155 can incorporate both the received changed user data and the unchanged user data of the previous full backup image into the present full backup image.

In light of the present disclosure, it will be appreciated that network storage 170 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, backup system 100 and network 105 can include other components such as routers, firewalls and the like that are not germane to the discussion of the present disclosure and will not be discussed further herein. It will also be appreciated that other configurations are possible. For example, clients 110(1)-(N) can be directly coupled to backup server 140, backup storage 160, metadata store 165, and/or network storage 170, and so on.

The letter N is used to indicate a variable number of devices or components. For example, a variable number of clients are implemented in the backup system. Although the letter N is used in describing a variable number of instances of each of these different devices and components, a repeated use of the letter N does not necessarily indicate that each device and component has a same number of N instances implemented in the backup system.

Figure 2A:
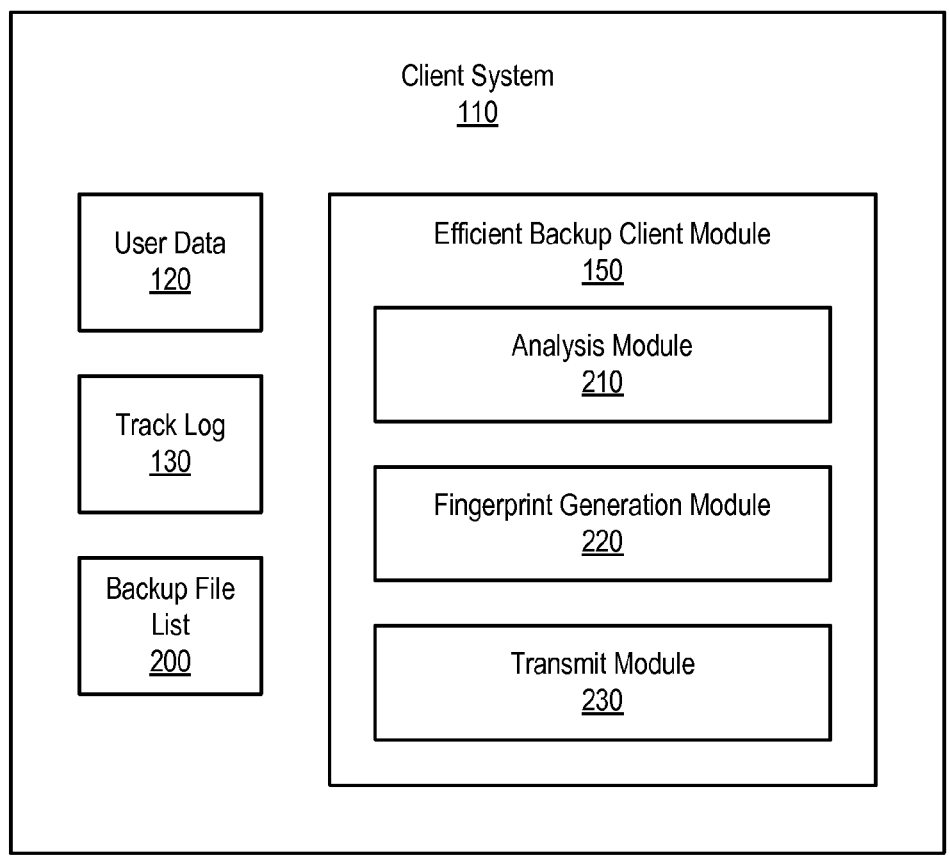
FIG. 2A is a simplified block diagram illustrating components of an example efficient backup client module, according to one embodiment.

FIG. 2A is a simplified block diagram illustrating components of an example efficient backup client module 150 (also referred to as a client module 150 or backup client module 150), which can be implemented in a client system 110, for example. Efficient backup client module 150 can include various components, such as an analysis module 210, a fingerprint generation module 220, and a transmit module 230, which are discussed in further detail below. Analysis module 210, fingerprint generation module 220, and transmit module 230 can be communicatively coupled to one another, and can cooperatively implement the processes of FIGS. 6A-C and 7A-B, as further discussed below.

As illustrated in FIG. 2A, client system 110 can store user data 120, a track log 130 and a backup file list 200, among other such information. As discussed above, user data 120 can include various data that is generated and/or consumed by a user of client system 110(1), such as files. Track log 130 can include, for example, a list of files (e.g., files of user data 120) that are included in an associated existing backup image (also referred to herein as a previous backup image), as well as associated file attributes of those files. Track log 130 can include file attributes of the files that were captured from the client file system at the time the previous backup image was created. In another embodiment, track log 130 can include segment attributes of file segments included in the associated existing backup image (e.g., the previous backup image), where the segment attributes were captured from the client file system at the time the previous backup image was created. Backup file list 200 is used to create a new backup image (also referred to herein as a present backup image) during a backup process, where the backup file list is a list of files (e.g., files of user data 120) that are to be included in the present backup image.

Analysis module 210 can be configured to determine whether files (e.g., files of user data 120, in their entirety) that are to be included in the present backup image (e.g., files listed in backup file list 200) have or have not changed since the point at which the previous backup image was created (e.g., since a creation time of the previous backup image). For each file listed in backup file list 200, analysis module 210 can be configured to compare the file's attributes recorded in track log 130 to the file's current attributes recorded in the client's file system to determine whether the file is changed (e.g., contains changed file data) or unchanged (e.g., contains unchanged file data).

In another embodiment, analysis module 210 can be configured to determine whether segments of the files listed in backup file list 200 have or have not changed since the time the previous backup image was created. In such an embodiment, analysis module 210 can be configured to compare the segment attributes of the file segments recorded in track log 130 to the current segment attributes of the file segments recorded in the client's file system to determine whether file segments of each file listed in the backup file list 200 are changed (e.g., contains changed file data) or unchanged (e.g., contains unchanged file data).

In such embodiments, a file that is not included the previous backup image (e.g., a new file) is treated as a changed file (which includes all changed file segments). Also in such embodiments, the determination is communicated to transmit module 230, which is configured to either transmit changed file data (which can include changed files or changed file segments) or transmit metadata identifying unchanged file data (which can include unchanged files or unchanged file segments), as further discussed below. The analysis process is discussed in further detail below, in reference to FIG. 6A-C.

Fingerprint generation module 220 can be configured to generate a fingerprint for a file, a file segment, or other unit of data. A fingerprint is a unique identifier of data (e.g., an entire file or a segment of a file) that is used to verify integrity of the data. A fingerprint can be a checksum or hash value that is calculated based upon file data (e.g., data included in a file or in a file segment). In many embodiments, fingerprints are generated in a manner (e.g., using a cryptographically strong, collision resistant hash function) that produces the same identifier for identical data, while also producing different identifiers for non-identical data. Regardless of which particular technique is used to generate fingerprints in backup system 100, the same fingerprint-generation technique is implemented by the fingerprint generation modules in the backup system. During a backup process, a fingerprint of a file can be added to track log 130 as an associated file attribute of the file, and a fingerprint of a file segment can be added to track log 130 as an associated segment attribute, as further discussed below in reference to FIG. 7A-B.

Transmit module 230 can be configured to transmit backup data to a backup server 140 (e.g., to efficient backup server module 155 on backup server 140 via a tar stream). A tar stream is a formatted stream of data transmitted from client 110 to another device (e.g., a stream of data formatted using the tar (Tape Archive) file format). For example, client 110 can transmit backup data (such as changed file data and/or metadata) as a tar stream across network 150 to backup server 140 (also referred to herein as transmitting backup data via a tar stream) to be included in a present backup image. Based on whether file data is changed file data or unchanged file data, transmit module 230 can be configured to generate an appropriate header for the file data, such as a data header or metadata header. For example, transmit module 230 can generate a data header for changed file data and transmit the data header and changed file data to backup server 140 via a tar stream. Transmit module 230 can also generate a metadata header for unchanged file data, where the metadata that identifies the unchanged file data is included in the metadata header. Transmit module 230 can transmit the metadata header to backup server 140 via the tar stream. The transmission process is discussed in further detail below, in reference to FIG. 7A-B.

Figure 2B:
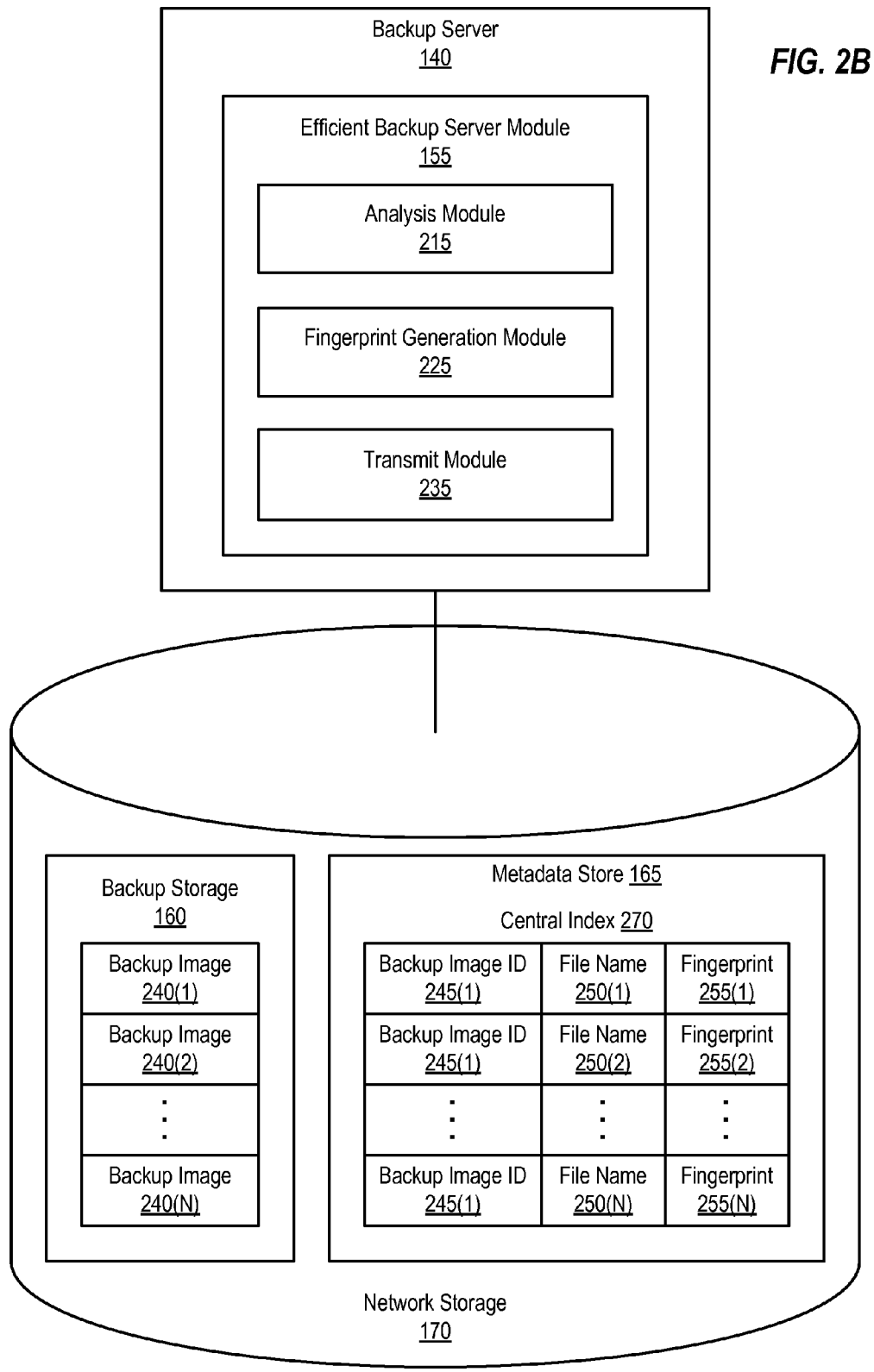
FIG. 2B is a simplified block diagram illustrating components of an example efficient backup server module, according to one embodiment.

FIG. 2B is a simplified block diagram illustrating components of an example efficient backup server module 155 (also referred to as a server module 155 or backup server module 155) in greater detail. Efficient backup server module 155 can be implemented in a backup server 140, which can include various components, such as an analysis module 215, a fingerprint generation module 225, and a transmit module 235, which are discussed in further detail below. Analysis module 215, fingerprint generation module 225, and transmit module 235 can be communicatively coupled to one another, can be configured to communicate with network storage 170 that stores backup storage 160 and metadata store 165, and can cooperatively implement the processes of FIG. 5A-B, as further discussed below.

Analysis module 215 can be configured to determine whether data received via the tar stream from a client 110 is changed file data or unchanged file data. Analysis module 215 can use the header associated with the received tar stream data to determine whether the tar stream data is changed file data (e.g., is associated with a data header) or unchanged file data (e.g., is associated with a metadata header). Changed file data (which can include entire files or file segments) can be written to the present backup image by transmit module 235, as discussed below. Unchanged file data (which can include entire files or file segments) can be extracted from a previous backup image, using the metadata included in the metadata header. The analysis process is discussed in further detail below, in reference to FIG. 5A-B.

Fingerprint generation module 225 can be configured to generate a fingerprint for a file, a file segment, or other unit of data. A fingerprint can be a checksum or hash value that is calculated based upon data (e.g., an entire file or a file segment) and is used to verify integrity of the data. Regardless of which particular technique is used to generate fingerprints in backup system 100, the same fingerprint-generation technique is implemented by the fingerprint generation modules in the backup system. During a backup process, a fingerprint of a file or a file segment can be added to metadata associated with a present backup image (e.g., can write a fingerprint to a central index 270 in metadata store 165), as further discussed below in reference to FIG. 5A-5B.

Transmit module 235 can be configured to write backup data to backup image 240 in backup storage 160, where backup data can include changed file data received from client 110 and/or unchanged file data extracted from a previous backup image in backup storage 160. Transmit module 235 can also be configured to write metadata about the backup images 240 into metadata store 165 (e.g., writing metadata into central index 270). For example, transmit module 235 can write a backup image identifier (ID) 245 into metadata store 165, where each backup image 240 is identified by a respective backup image ID 245. Transmit module 235 can also write a list of files that are included in a particular backup image 240 into metadata store 165. The files can each be identified by a respective file name 250. For example, a list of file names (e.g., file names 250(1)-(N)) can be stored in central index 270, where the file names (e.g., file names 250) are associated with a backup image ID 245 of the particular backup image (e.g., backup image 240(1)).

Transmit module 235 can also be configured to write fingerprints into metadata store 165. Each file can be associated with at least one fingerprint that uniquely identifies file data (e.g., the entire file or a file segment). For example, each of file names 250(1)-(N) can be stored in central index 270 with a respective one of fingerprints 255. Thus, a backup image ID 245 of one of backup images 240 and a file name 250 of a given file (where the backup image 240 contains the file) can be used as a key into central index 270 to locate a corresponding one of fingerprints 255 for the file. In another embodiment, each of file names 250 can be associated with fingerprints of the file segments of the file in central index 270.

FIG. 3 is a simplified block diagram illustrating components of an example of track log 130. Track log 130 can be associated with a backup image, where the associated backup image can be identified by a backup identifier (ID) 315 in a header 310 of track log 130. In the embodiment shown, the backup ID for track log 130 is user01_Backup0001. Track log 130 can be generated at the time the associated backup image is generated. In another embodiment, track log 130 can include a backup image creation time of the associated backup image.

Track log 130 can also include multiple log entries 380, which can be file entries, segment entries, or the like, or some combination thereof. In one embodiment, track log 130 can include multiple file entries, one entry for each file that is included in the associated backup image. In such an embodiment, track log 130 can include file entries 380(1)-(5) for files t1-t5.

In another embodiment, track log 130 can include multiple segment entries, one for each file segment of a file that is included in the associated backup image. In such an embodiment, track log 130 can include segment entries 380(1)-(5) for segments t1-t5. In another embodiment, track log 130 can include both file and segment entries, where a file entry of a file can be associated with segment entries of the file segments included in the file.

For each entry 380, track log 130 includes attributes of a file (e.g., file attributes) or a file segment (e.g., segment attributes). Such attributes can include a block start 320, a block count 330, a change time 340, a modify time 350, a path 360, and a fingerprint 370. Such attributes are captured and included in the track log 130 at the time the associated backup image is created. Other attributes can be used additionally or alternatively to the attributes discussed herein.

Block start 320 of a file entry indicates the starting or initial block of the file within the associated backup image. In an embodiment of track log 130 that includes file entries, file t1 starts at block 0 of the backup image user01_Backup0001. Similarly, block start 320 of a segment entry indicates the starting or initial block of the file segment within the associated backup image. In an embodiment of track log 130 that includes segment entries, file segment t1 starts at block 0 of the backup image user01_Backup0001.

Block count 330 of a file entry indicates the end block of the file in the associated backup image. In an embodiment of track log 130 that includes file entries, file t1's end block is 10, which indicates that file t1 includes blocks 0 through 10 in the backup image user01_Backup0001. Similarly, block count 330 of a segment entry indicates the end block of the file segment in the associated backup image. In an embodiment of track log 130 that includes segment entries, file segment t1's end block is 10, which indicates that file segment t1 includes blocks 0 through 10 in the backup image user01_Backup0001. In an alternative embodiment, block count 330 can indicate a block length of a respective file or file segment relative to a block start of the respective file or file segment.

Path 360 of a file entry provides a pathname for the file, which indicates where the file is located on the client system 110. Path 360 of a segment entry can similarly provide a pathname for the file (which is located on the client system 110) that includes the file segment. In an alternative embodiment, path 360 of a segment entry can provide a file name of the file that includes the file segment, and path 360 of a file entry can provide a pathname for the file that includes the file segment.

Change time 340 of a file entry indicates a change time of the file, or the last time the metadata and/or data of the file was modified or changed. Similarly, change time 340 of a segment entry indicates a change time of the file segment, or the last time the metadata and/or data of the segment was modified or change. Modify time 350 of a file entry indicates a modification time of the file, or the last time the data of the file was modified or changed. Similarly, modify time 350 of a segment entry indicates a modification time of the file segment, or the last time the data of the file segment was modified or changed. Thus, change time 340 and modify time 350 of a respective log entry (e.g., in a file entry or in a segment entry) are often the same value.

When a log entry (e.g., a file entry or a segment entry) is added to track log 130, change time 340 and modify time 350 of the log entry are set to a respective file's or segment's present change time and modify time in the client's file system. Change time 340 and modify time 350 can be used to determine whether file data (e.g., the entire file or file segments) has been modified or changed since the time of the associated backup image. For example, the modify time of a respective file or file segment in the track log can be compared to the present modification time of the respective file or file segment in the client file system. As will be appreciated, other criteria (e.g., data size of a file, archive bit setting on a file, and the like) can also be used to determine whether file data has been modified or changed, and are intended to be included in the scope of the present disclosure.

Fingerprint 370 is a unique identifier of data (e.g., an entire file, file segments, or other unit of data) that is used to verify integrity of the data. A fingerprint can be a checksum or hash value that is calculated based upon file data (e.g., data included in a file or in a file segment). In many embodiments, fingerprints 370 are generated in a manner (e.g., using a cryptographically strong, collision resistant hash function) that produces the same identifier for identical items of data, while also producing different identifiers for non-identical items of data. Regardless of which particular technique is used to generate fingerprints, the same fingerprint-generation technique is implemented by all clients of backup server 140 (e.g., by all efficient backup client modules 150 and all efficient backup server modules 155 in backup system 100). In an alternative embodiment, different fingerprint-generation techniques can be used across the clients.

Figure 4:
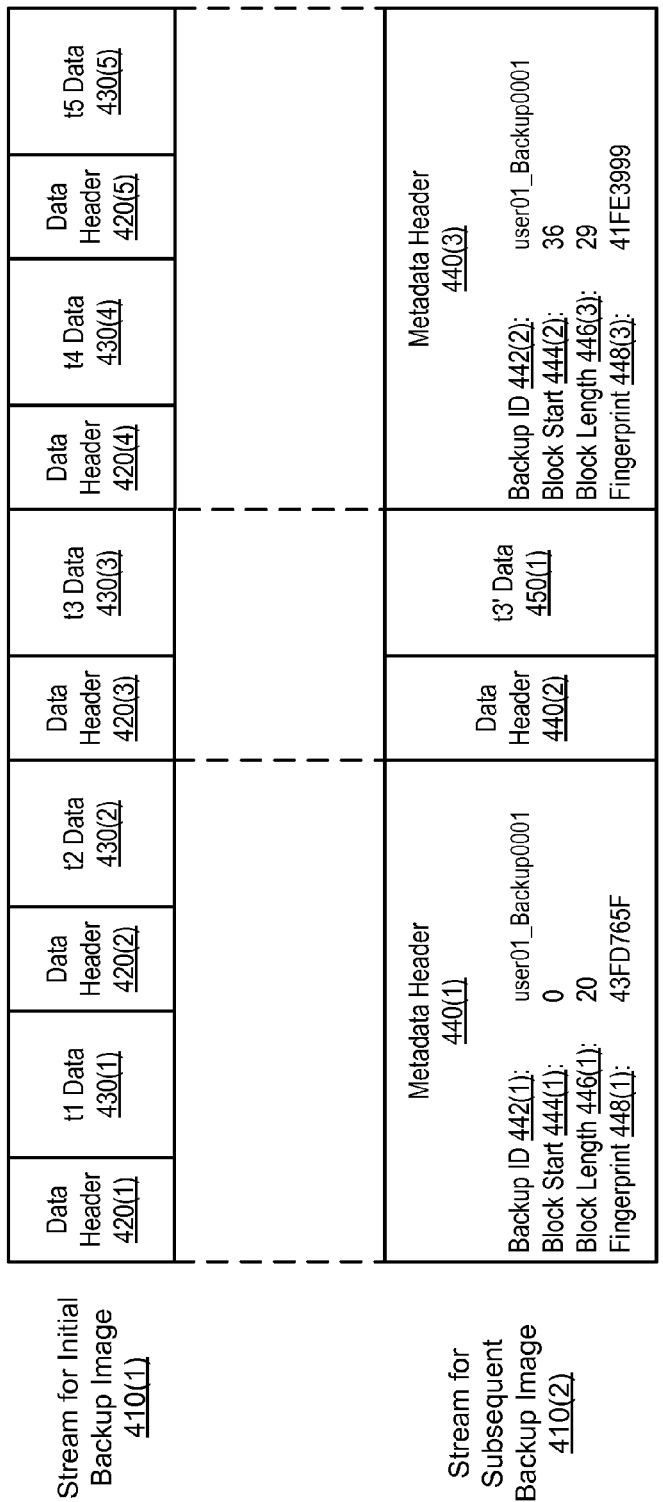
FIG. 4 is a simplified block diagram illustrating components of example streams of transmitted data for an initial backup image and for a subsequent backup image, according to one embodiment.

FIG. 4 is a simplified block diagram illustrating elements of a first stream of transmitted data for an initial backup image 410(1) and a second stream of transmitted data for a subsequent backup image 410(2). The first and second streams 410 are transmitted from a client 110 to backup server 140. In one embodiment, data 430 of files t1-t5 are being transmitted via first stream 410(1) to be included in the initial backup image. In such an embodiment, track log 130 of FIG. 3 is associated with the initial backup image and indicates file attributes of files t1-t5. Data 430 of each file is also associated with a data header 420, which is also transmitted to backup server 140 via the first stream 410(1).

Second stream 410(2) is implemented using the present disclosure, where files t1, t2, t4 and t5 have not changed since the initial backup image, and file t3 has changed since the initial backup image was created. Client 110 can determine that the files have or have not changed using track log 130 associated with the initial backup image. If the files have not changed since the initial backup image, the initial backup image can be used as a base backup image from which the unchanged files can be extracted. Rather than re-transmitting data for file t1, which has not changed since the last backup image, client 110 can instead transmit metadata that identifies file t1 to the backup server 140 as unchanged file data. Also, since both files t1 and t2 are unchanged, and files t1 and t2 are contiguous in the initial backup image (e.g., file t1 occupies blocks 0-10 and file t2 occupies blocks 11-20 in the initial backup image), client 110 can transmit metadata that identifies both files t1 and t2 as a chunk of unchanged file data. The metadata identifying the chunk of unchanged file data can be obtained from file attributes of the contiguous unchanged files t1 and t2, which are stored in track log 130 that is associated with the initial backup image. The metadata can be included in a metadata header 440(1) and transmitted to backup server 140 via second stream 410(2).

The metadata can include backup ID 442 of the backup image that contains files t1 and t2, or the backup identifier of the initial backup image (e.g., backup ID 315 user01_Backup0001 in track log 130). The metadata can also include a location of the chunk of unchanged file data, such as a starting block and length of the chunk of unchanged file data. Block start 444 indicates the starting block of the chunk of unchanged file data in the backup image, which is the starting block of the first file included in the chunk of unchanged file data. Block start 444 can be determined using track log 130. For example, track log 130 indicates that file t1, or the first file included in the chunk of unchanged file data, has a block start 320 of 0, which can be used as the block start 444 of the chunk of unchanged file data.

Block length 446 indicates the length of the chunk of unchanged file data relative to block start 444 of the chunk of unchanged file data. Block length 446 can be calculated from the track log 130 using block start 320 and block count 330 of the files included in the chunk of unchanged file data. For example, the chunk of unchanged file data that includes file t1 and t2 can have a block length 446 of 20, indicating that the chunk of unchanged file data occupies blocks 0 through 20 of the initial backup image.

The metadata can also include a fingerprint 448, which is the fingerprint of the first file included in the chunk of unchanged file data, or fingerprint 370 of file t1 in track log 130. Fingerprint 448 can be used to verify the integrity of the chunk of unchanged file data in the initial backup image.

File data of file t3 has changed since the initial backup image was created, and thus can be transmitted via second stream 410(2) to backup server 140. A data header 440 can also be associated with t3 data 450 and transmitted via second stream 410(2).

File data of files t4 and t5 have not changed since the initial backup image. Rather than re-transmitting file data of files t4 and t5, client 110 can instead transmit metadata that identifies files t4 and t5 to backup server 140 as another chunk of unchanged file data, since files t4 and t5 are contiguous in the initial backup image (file t4 occupies blocks 36-49 and file t5 occupies blocks 50-65 in the initial backup image). The metadata (e.g., backup ID 442, block start 444, block length 446, and fingerprint 448) can be included in a metadata header 440(3) and transmitted to backup server 140 via second stream 410(2). Thus, second stream 410(2) includes a smaller amount of backup data (e.g., the changed file data of file t3 and metadata identifying unchanged file data of files t1, t2, t4, and t5) being transmitted to backup server 140, as compared to the total amount of backup data (e.g., the file data of files t1-t5) transmitted via first stream 410(1).

In another embodiment, t1-t5 can be segments of a file. In such an embodiment, the metadata identifying the first chunk of unchanged file data can be obtained from segment attributes of contiguous unchanged segments t1 and t2, which are stored in track log 130 associated with the initial backup image. This metadata can be included in metadata header 440(1) (e.g., backup ID 442 of the backup image that contains the segments t1 and t2, block start 444 that indicates the starting block of the chunk of unchanged file data, block length 446 that indicates the length of the chunk of unchanged file data, and a fingerprint 448 of the first segment included in the chunk of unchanged file data). Similarly, metadata identifying the second chunk of unchanged file data can be obtained from segment attributes of contiguous unchanged segments t4 and t5, and can be included in metadata header 440(3). Metadata headers 440(1) and 440(3) and data 450 of changed segment t3 (and a data header 440(2) associated with changed segment t3) can be transmitted to backup server 140 via second stream 410(2).

Figure 5A:
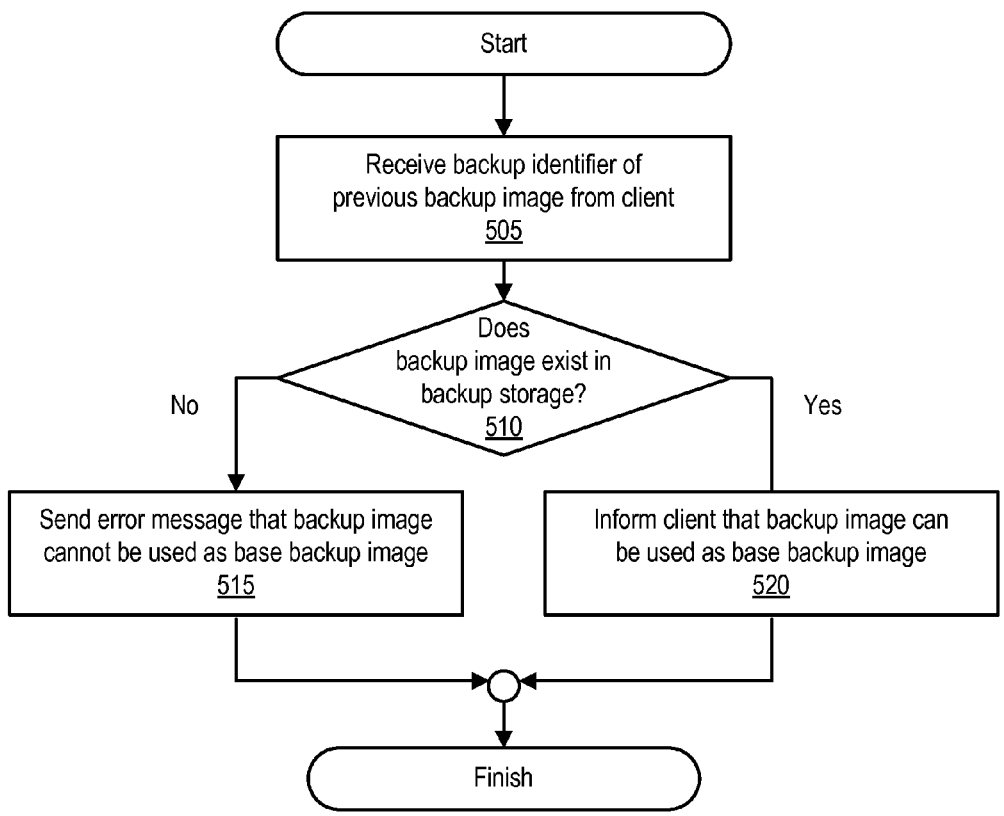
FIG. 5A is a flowchart illustrating an example backup initialization process implemented by an efficient backup server module, according to one embodiment.

FIG. 5A is a flowchart illustrating an example backup initialization process implemented by an efficient backup server module (e.g., by analysis module 215 of efficient backup server module 155). The process of FIG. 5A can be implemented at the beginning of a backup process for creating a present backup image. The process begins at operation 505, where server module 155 of backup server 140 receives a backup identifier (ID) of a previous backup image from a client 110, such as from a client module 150 on client 110. Client module 150 extracts the backup ID from a track log associated with the previous backup image and transmits the backup ID to the server module 155 on backup server 140. The backup ID is received from network 105 on a port of backup server 140 and routed to server module 155. The process continues to operation 510, where server module 155 verifies the backup image identified by the backup ID exists in backup storage. If the backup image exists, the process continues to operation 520, where server module 155 informs client module 150 that the identified backup image can be used as a base backup image. In other words, data from the base backup image (e.g., previous backup image) can be used to create the present backup image. The process then ends.

Returning to operation 510, if the backup image does not exist in backup storage, the process continues to operation 515, where server module 155 sends an error message to client module 150, indicating that the backup image identified by the backup ID cannot be used as the base backup image. In such a case, the process of FIG. 5A then ends. In response to the error message, client 110 can instead perform a traditional full backup image, or alternatively, select another backup image for use as a base backup image (i.e., transmit another backup ID that identifies another backup image to the backup server) in a second (or subsequent) attempt to execute the backup process for creating a present backup image.

Figure 5B:
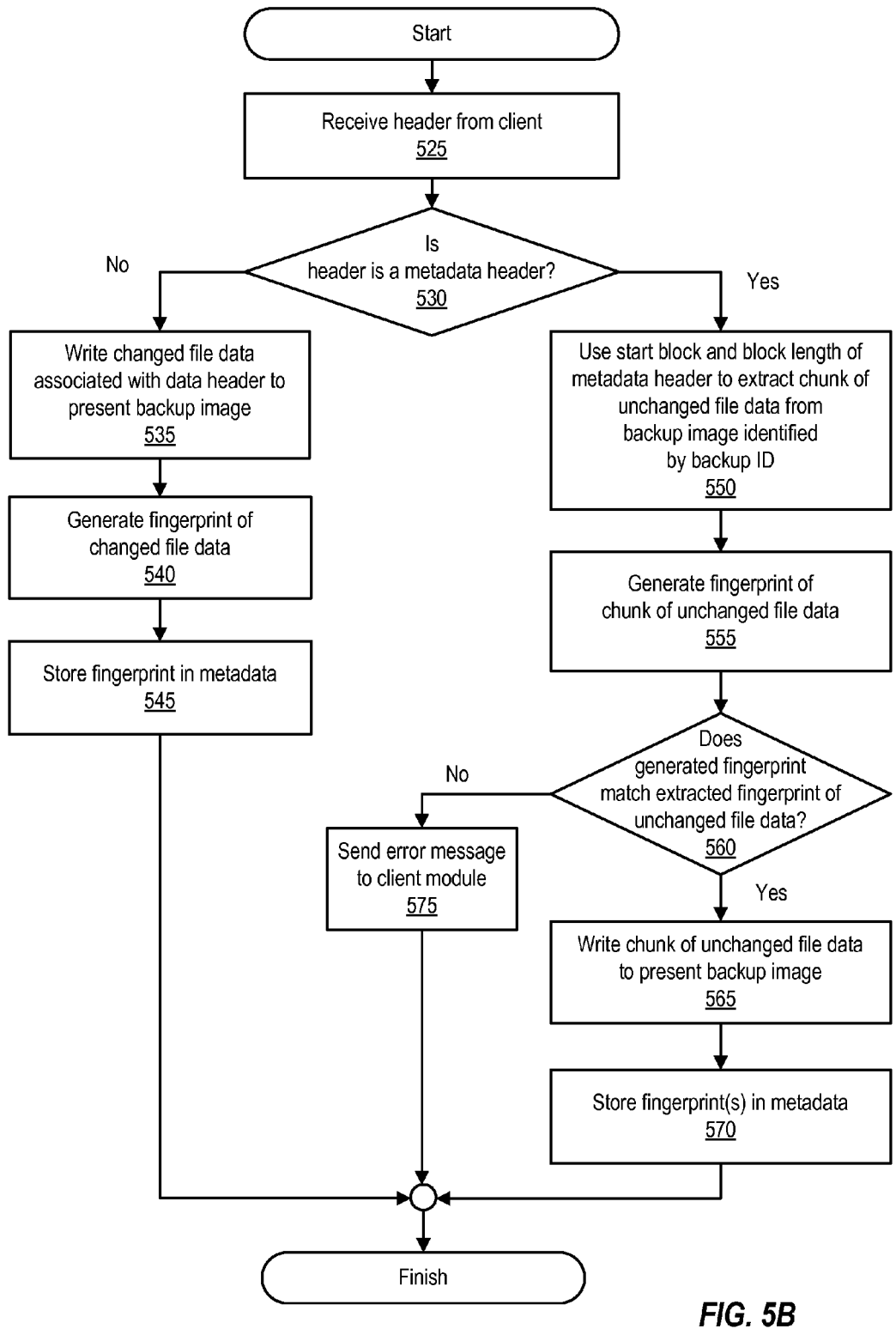
FIG. 5B is a flow chart illustrating an example backup image generation process implemented by an efficient backup server module, according to one embodiment.

FIG. 5B is a flowchart illustrating an example backup image generation process, which can be implemented by an efficient backup server module 155 as part of an efficient full backup process (e.g., the generation process can be cooperatively implemented by an analysis module 215, a fingerprint generation module 225, and a transmit module 235 of efficient backup server module 155). The process of FIG. 5B can be repeated as data is received from client 110 via a stream, which is transmitted from client 110 to backup server 140 across network 105. For example, the process of FIG. 5B can be executed when data of the stream (e.g., data headers, associated changed file data, metadata headers, and associated unchanged file data) is detected at the backup server 140, where the data can be received via a port of the backup server 140.

The process of FIG. 5B starts at operation 525, receiving a header from a client module 150 via a stream. The process continues to operation 530, where server module 155 determines whether the received header is a metadata header. If the header is not a metadata header, the header is otherwise a data header, and the process continues to operation 535, where server module 155 writes the changed file data (which can include an entire file or a file segment) associated with the data header to the present backup image, where the changed file data is also received via the stream. The process continues to operation 540, where server module 155 generates a fingerprint for the changed file data (e.g., for the file or for the file segment). Alternatively, the data header may include a fingerprint associated with the changed file data, where the fingerprint was generated by client module 150. The process continues to operation 545, where server module 155 stores the fingerprint (e.g., a fingerprint generated either by client module 150 or by server module 150) in metadata that is associated with the present backup image. For example, the fingerprint can be associated with an identifier of a respective file or file segment in central index 170 in metadata store 165, where the fingerprint is generated from the respective file or file segment. The process then ends.

Returning to operation 530, if the header is a metadata header, the process continues to operation 550. The start block, block length, backup ID, and fingerprint are then extracted from the metadata header. The start block and block length can be used to extract a chunk of unchanged file data (which can include entire files or file segments) from the backup image (e.g., the previous backup image) that is identified by the backup ID. The process continues to operation 555, where server module 155 generates a fingerprint of the chunk of unchanged file data. In one embodiment, the fingerprint can be generated by applying a fingerprint generation function to data of a first file of the chunk, where the data is extracted from the previous backup image. In another embodiment, a fingerprint can be generated by applying a fingerprint generation function to data of a first file segment of the chunk that is extracted from the previous backup image. Alternatively, the fingerprint can be generated by extracting a fingerprint that is associated with a respective first file or file segment of the chunk from metadata associated with the previous backup image (e.g., from metadata store 165).

The process then continues to operation 560, where server module 155 verifies whether the generated fingerprint matches the fingerprint extracted from the metadata header. If the generated fingerprint matches the metadata fingerprint, the integrity of the chunk of unchanged file data is verified and the process continues to operation 565, where server module 155 writes the chunk of unchanged file data to the present backup image. In other words, a copy of the unchanged file data chunk is extracted from the previous backup image using the metadata extracted from the metadata header (in operation 550), and is written to a present backup image (in operation 565).

The process then continues to operation 570, where server module 155 stores one or more fingerprints of the chunk of unchanged file data in metadata associated with the present backup image. In one embodiment, a fingerprint of each file included in the chunk of unchanged file data can be extracted from metadata associated with the previous backup image and can then be stored in metadata associated with the present backup image. In another embodiment, a fingerprint of each file segment included in the chunk of unchanged file data can be extracted from metadata associated with the previous backup image and can be stored in metadata associated with the present backup image. Once operation 570 is complete, the process concludes.

Returning to operation 560, if the generated fingerprint does not match the stored fingerprint, the integrity of the chunk of unchanged file data is in question, and the process continues to operation 575, where server module 155 sends an error message to client module 150. Based on the backup configuration, client module 150 can transmit the unchanged file data (e.g., file data of the unchanged files or unchanged file segments) to the backup server for inclusion in the present backup image, in response to the error message. Alternatively, the backup process can abort in response to the error message. If the backup process aborts, client 110 can select another backup image as the base backup image in a second (or subsequent) attempt to execute the backup process, as discussed in reference to FIG. 5A. The process then ends.

Figure 6A:
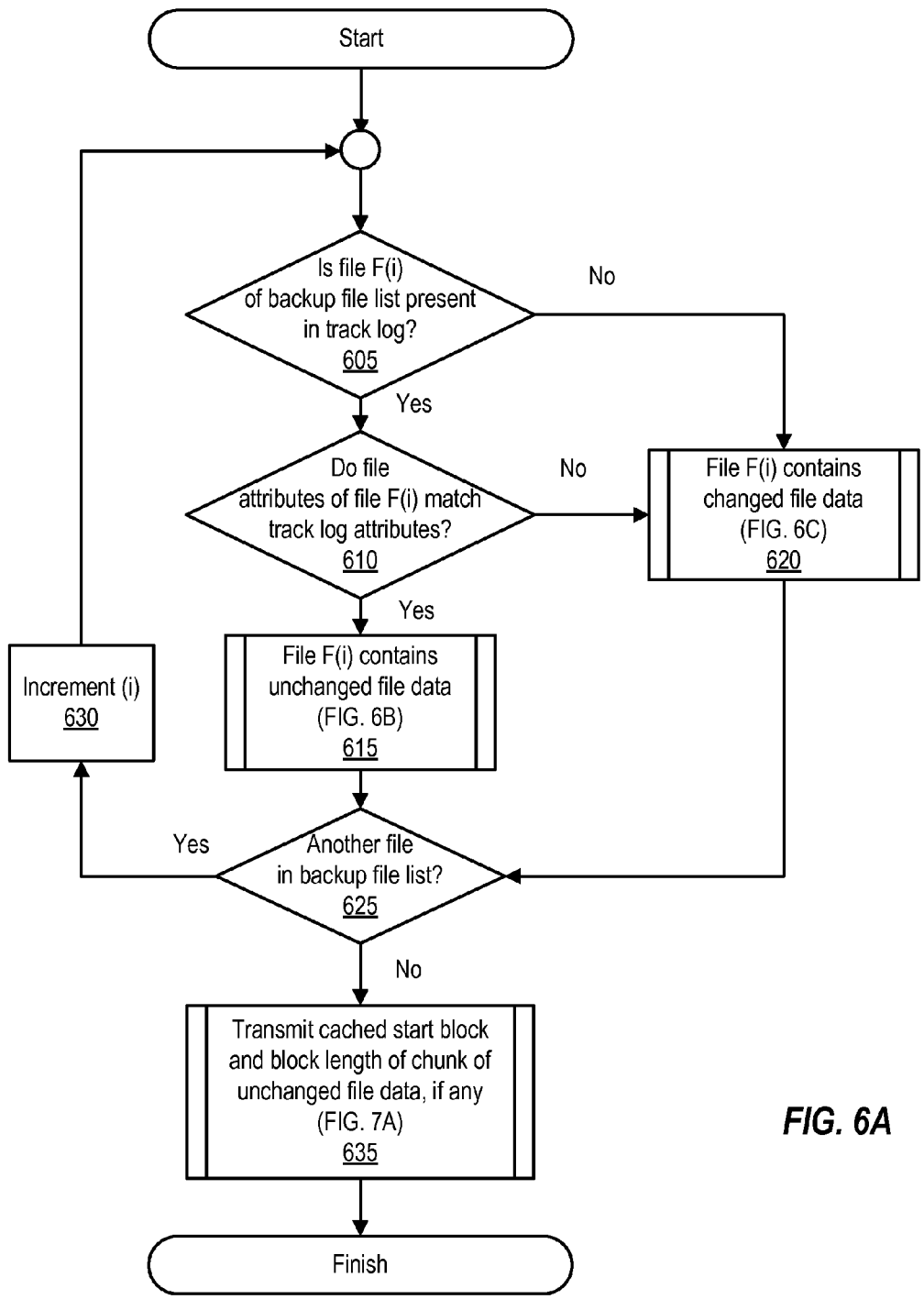
FIGS. 6A, 6B, and 6C are flowcharts illustrating an example analysis process implemented by an efficient backup client module, according to one embodiment.

FIG. 6A is a flowchart illustrating an example analysis process to determine changed and unchanged file data, which can implemented by an efficient backup client module 150 as part of an efficient full backup process (e.g., the analysis process can be cooperatively implemented by analysis module 210, fingerprint generation module 220, and transmit module 230 of efficient backup client module 150). The analysis process of FIG. 6A can be executed as part of a backup process to create a present backup image of user data.

The process of FIG. 6A starts at operation 605, where client module 150 determines whether file F(i) of the backup file list is present in a track log. A backup file list is used to create a backup image during a backup process, where the backup file list of operation 605 is a list of files that are to be included in the present backup image. A track log includes a list of files that are included in an existing backup image. A track log can be initialized to contain file attributes of the included files, or segment attributes of the file segments of the included files, at the time the associated backup image was created. The track log of operation 605 includes a list of files that are included in the previous backup image.

Operation 605 begins a sequence of operations that can be repeated for each file in the backup file list. A present iteration of the sequence is indicated by the letter i, which can be initialized to one (thus starting the sequence with a first file in the backup file list) when the analysis process is initiated. A cache used by client module 150 (e.g., a cache or buffer of client 110) can also be cleared when the analysis process is initiated. At the end of the sequence, the letter i is incremented (e.g., operation 630), indicating that a next file of the backup file list can be analyzed (if there is another file to be analyzed).

If file F(i) of the backup file list is not present in the track log (e.g., file F(i) was not included in the previous backup image), the process continues to operation 620, where file F(i) effectively contains changed file data (e.g., file F(i) is a changed file). Since file F(i) is not included in the previous backup image, the file data of file F(i) is sent to the backup server to be added to the present backup image. In one embodiment, the file segments of file F(i) are sent to the backup server to be added to the present backup image. Operation 620 is shown in further detail in FIG. 6C. The process then continues to operation 625, where client module 150 determines whether another file is in the backup file list, which is discussed below.

Returning to operation 605, if file F(i) of the backup file list is present in the track log (e.g., file F(i) was included in the previous backup image), the process continues to operation 610, where client module 150 determines whether current file attributes of the file F(i) match the file's attributes in the track log. The track log can be used to determine if a file has changed since the previous backup image was created. In one embodiment, file attributes of the files (which are included in the previous backup image) are updated in the client's file system as the files change. An example file attribute can include a modification time, or the last time file data of the file was modified or changed. File F(i)'s current attributes in the file system can be compared with file F(i)'s attributes in the track log, which were captured at the time the previous backup image was created. If file F(i)'s current attributes in the file system and the track log do not match one another (i.e., the modification time of file F(i) in the file system is different from or later than the modification time of file F(i) in the track log), file F(i) contains changed file data (e.g., file F(i) has changed). In another embodiment, file F(i)'s modification time in the file system can be compared to a backup image creation time of the backup image, which can be recorded in the track log. If file F(i)'s modification time is later than the backup image creation time (i.e., the file data of the file was modified after the creation of the previous backup image that includes the file), file F(i) has changed. If file F(i) has changed, the process continues to operation 620 (also shown in further detail in FIG. 6C), discussed above.

If file F(i)'s current file attributes match the file attributes in the track log 130, file F(i) has not changed and the process continues to operation 615, where file F(i) contains unchanged file data (e.g., file F(i) has not changed). Since file F(i) has not changed and was present in the track log (which is associated with the previous backup image), the file data of file F(i) is already included in the previous backup image. Thus, rather than re-transmitting the unchanged file data of file F(i) to the backup server, client module 150 can instead transmit metadata that identifies file F(i)'s unchanged file data in the previous backup image to the backup server. Operation 615 is shown in further detail in FIG. 6B.

The process then continues to operation 625, where client module 150 determines whether another file is in the backup file list. If another file is in the backup file list, the process continues to operation 630, incrementing i, and returns to operation 605 to analyze the next file in the backup file list. If another file is not in the backup file list, then all files of the backup file list have been analyzed and the process continues to operation 635.

In another embodiment, operations 610, 615, and 620 of FIG. 6A can be configured such that segment attributes, rather than file attributes, are evaluated. For example, client module 150 can evaluate segment attributes of a file segment S(j) of file F(i) in operation 610. The letter j indicates a present file segment of file F(i), where letter j can be initialized to one (thus indicating a first file segment of file F(i)) when the analysis process begins analyzing a file F(i). If file segment S(j)'s current segment attributes in the client file system match the segment attributes in the track log, file segment S(j) is an unchanged segment, and the process continues to operation 620. If file segment S(j)'s current segment attributes in the client file system do not match the segment attributes in the track log, file segment S(j) is a changed segment, and the process continues to operation 615. After the completion of operations 615 and 620, client module 150 determines if there is a next file segment of file F(i). If there is a next file segment S(j) of file F(i), the letter j is incremented and the process returns to operation 610. After all file segments of file F(i) have been evaluated (e.g., if there is not a next file segment S(j)), the process continues to operation 625, where client module 150 determines whether another file is in the backup list. The sub-processes of FIGS. 6B and 6C can also evaluate segment attributes rather than file attributes, as discussed below.

Figure 6B:
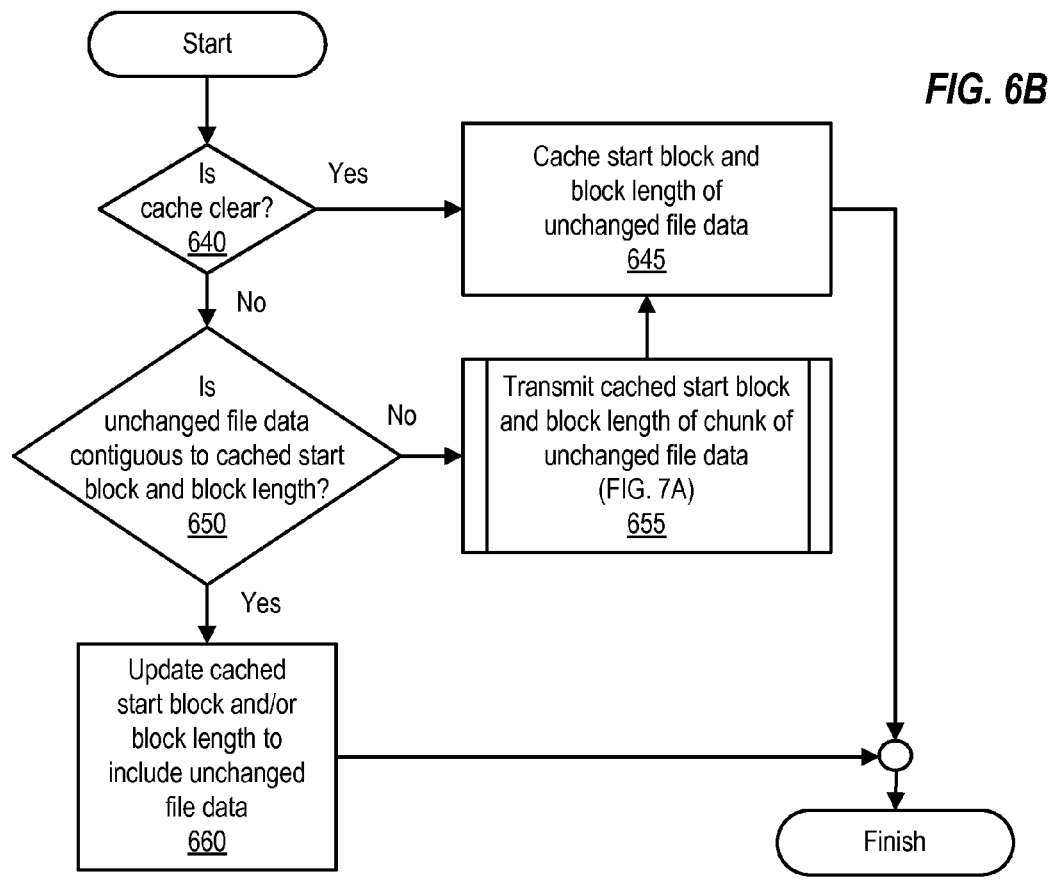
Figure 6C:
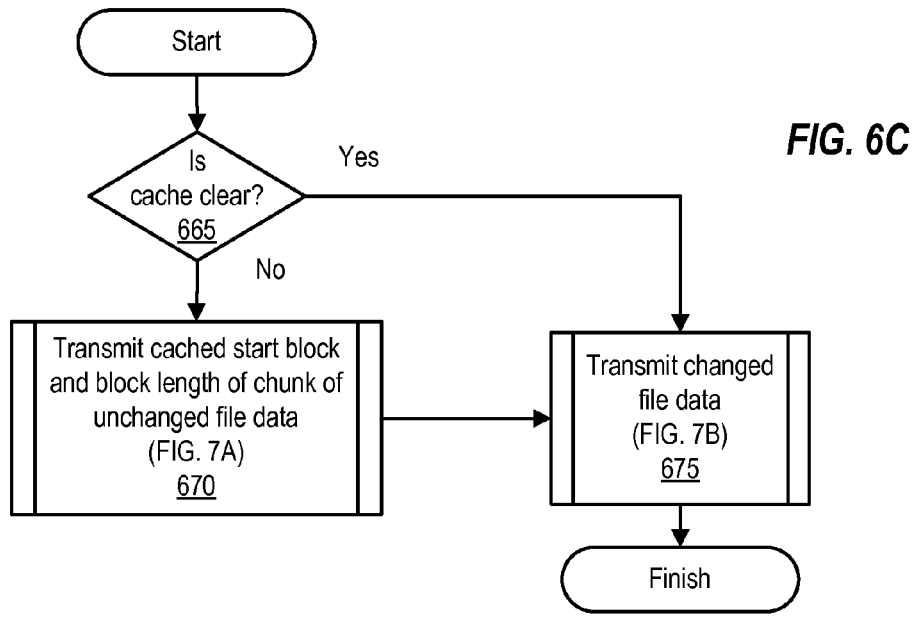

Operation 635 is a clean-up operation, which ensures that the metadata identifying a chunk of unchanged file data has been transmitted to the backup server 140, which is also discussed in FIGS. 6B and 6C. Operation 635 is also shown in further detail in FIG. 7A. Operation 635 provides for transmitting a cached start block and cached block length of a chunk of unchanged file data, if any is cached, to the backup server. The process of FIG. 6A then ends.

FIG. 6B is a flowchart illustrating an example analysis sub-process for unchanged file data (e.g., for a file F(i) or a file segment S(j) of file F(i)), which can be implemented by efficient backup client module 150. Rather than sending metadata to a backup server for each unchanged file or file segment, metadata indicating multiple unchanged files or file segments that are contiguous in the previous backup image can be sent. The process of FIG. 6B provides for identifying a chunk of contiguous unchanged file data by caching a start block and a block length that indicates the location of the chunk in the previous backup image. The cached start block and/or cached block length can be expanded to include additional unchanged file data (e.g., files or file segments) that is contiguous to the chunk in the previous backup image. The cached start block and cached block length can be transmitted to the backup server, which reduces the amount of backup data transmitted to the backup server.

Figures 7A, 7B:
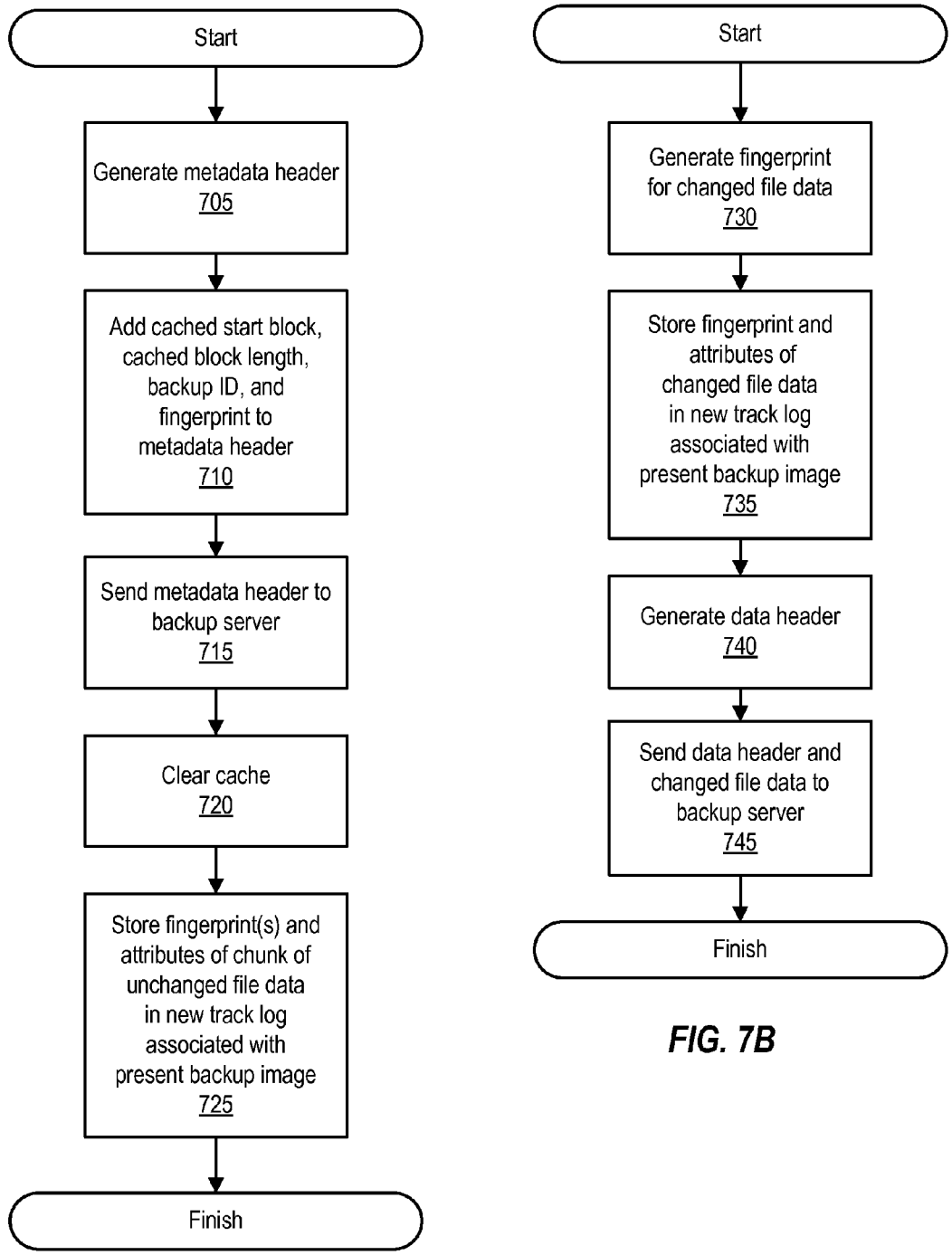
FIGS. 7A and 7B are flowcharts illustrating an example transmission process implemented by an efficient backup client module, according to one embodiment.

The process of FIG. 6B starts at operation 640, where client module 150 determines whether the cache is clear. As discussed above with respect to operation 605, the cache is initially cleared when the analysis process of FIG. 6A begins. The cache is also cleared during an iteration of the process depicted in FIG. 7A is performed, when the cached start block and cached block length are transmitted to the backup server, discussed in further detail below. If the cache is clear, the process continues to operation 645, where client module 150 caches start block and block length of the unchanged file data (e.g., file F(i) or file segment S(j)). In one embodiment, the start block and block length of file F(i) can be extracted from the track log (e.g., track log 130 of FIG. 3) associated with the previous backup image and cached. In another embodiment, the start block and block length of file segment S(j) can be extracted from the track log and cached. The process of FIG. 6B then ends.

Returning to operation 640, if the cache is not clear (e.g., on a subsequent iteration of FIG. 6B), the process continues to operation 650, client module 150 determines whether unchanged file data is contiguous to the cached start block and block length (e.g., whether file F(i) or file segment S(j) is contiguous to the files or file segments identified by the cached start block and block length). In one embodiment, client module 150 can determine whether file F(i) is contiguous by comparing file F(i)'s start block and block count in the track log to the cached start block and cached block length. In another embodiment, client module 150 can determine whether file segment S(j) is contiguous by comparing file segment S(j)'s start block and block count in the track log to the cached start block and cached block length.

If the unchanged file data (e.g., file F(i) or file segment S(j)) is contiguous to the cached start block and cached block length, the process continues to operation 660, where client module 150 updates the cached start block and/or cached block length to include the unchanged file data (e.g., file F(i) or file segment S(j)). For example, if file F(i) is located contiguously subsequent to the unchanged file data (e.g., cached start block is 0, cached block length is 10, file F(i)'s start block is 11, and file F(i)'s block count is 20), file F(i)'s block length can be calculated from the track log and added to the cached block length. In another example, if file F(i) is located contiguously before the unchanged file data (e.g., file F(i)'s start block is 36, file F(i)'s block count is 49, cached start block is 50, and cached block length is 15), file F(i)'s start block can overwrite the cached start block (e.g., new cached start block of 36) and the file F(i)'s block length can be added to the cached block length. The process of FIG. 6B then ends.

Returning to operation 650, if the unchanged file data is not contiguous to the cached start block and cached block length (which identifies a first chunk of unchanged file data), then the unchanged file data (e.g., file F(i) or file segment S(j)) is part of a second chunk of unchanged file data. In such a case, the cached start block and cached block length that identifies the first chunk of unchanged file data should be transmitted to the backup server before caching information that identifies the second chunk of unchanged file data. Thus, the process continues to operation 655, where client module 150 transmits the cached start block and block length of the first chunk of unchanged file data to the backup server, which is further described in FIG. 7A. The process then continues to operation 645, where client module 150 caches the start block and block length of the unchanged file data (e.g., file F(i) or file segment S(j)). The process of FIG. 6B then ends.

FIG. 6C is a flowchart illustrating an example analysis sub-process for changed file data (e.g., for a file F(i) or a file segment S(j) of file F(i)), which can be implemented by an efficient backup client module 150. As shown in FIG. 6A, once changed file data is determined (e.g., file F(i) or file segment S(j) of file F(i) is determined to be changed), the changed file data (e.g., file F(i) or file segment S(j)) can be transmitted to backup server. However, up to this point, a growing amount of unchanged file data (e.g., unchanged files or unchanged file segments) may have been identified as part of a contiguous chunk of unchanged file data in the previous backup image. Metadata (e.g., the cached start block and cached block length) identifying such a chunk of unchanged file data should also be transmitted to the backup server.

The process of FIG. 6C starts at operation 665, where client module 150 determines whether the cache is clear. If the cache is clear (e.g., the cache does not contain metadata that identifies a chunk of unchanged file data), the process continues to operation 675, where client module 150 transmits the changed file data (e.g., changed file F(i) or changed file segment S(j)) to backup server, shown in further detail in FIG. 7B. The process then ends.

Returning to operation 665, if the cache is not clear (e.g., the cache contains metadata that identifies a chunk of unchanged file data, which needs to be transmitted to the backup server 140), the process continues to operation 670, where client module 150 transmits the cached start block and cached block length of the chunk of unchanged file data (which can include files or file segments) to the backup server, which is shown in further detail in FIG. 7A. The process then continues to operation 675, client module 150 transmits the changed file data (e.g., changed file F(i) or changed file segment S(j)) to backup server, shown in further detail in FIG. 7B. The process then ends.

FIG. 7A is a flowchart illustrating an example transmission sub-process for unchanged file data, implemented by an efficient backup client module 150 (e.g., by transmit module 230 of efficient backup client module 150). The process begins at operation 705, where client module 150 generates a metadata header. The process continues to operation 710, where client module 150 adds the cached start block and cached block length of the chunk of unchanged file data (which can include files or file segments) to the metadata header. The backup ID of the previous backup image (which contains the unchanged file data) is also added to the metadata header. Finally, a fingerprint of the first file or first file segment included in the chunk of unchanged file data is added to the metadata header. The fingerprint (e.g., a checksum or hash value) can be used by the backup server to verify integrity of the chunk of unchanged file data. The process continues to operation 715, where client module 150 sends the metadata header to the backup server. The process then continues to operation 720, where client module 150 clears the cache.

The process then continues to operation 725, where client module 150 stores one or more fingerprints and attributes of the chunk of unchanged file data in a new track log associated with the present backup image. When a new backup image (e.g., the present backup image) is created using a backup process, a new track log associated with the new backup image is also created at the time the backup process is started. Since the unchanged file data has not changed since the time the previous backup image was created, the attributes and fingerprints of the chunk of unchanged file data also have not changed and thus can be extracted from the (old) track log associated with the previous backup image. The extracted attributes and fingerprints can then be stored in the new track log associated with the present backup image. The new track log can optionally overwrite the old track log. Although operation 725 is shown as occurring subsequent to operations 705-720, operation 725 can alternatively occur before or in parallel to operations 705-720.

In one embodiment, a fingerprint and file attributes of each file included in the chunk of unchanged file data can be extracted from the (old) track log associated with the previous backup image. In such an embodiment, the fingerprint and file attributes of each file can be stored in a new entry that is appended to the end of the new track log. In another embodiment, a fingerprint and segment attributes of each file segment included in the chunk of unchanged file data can be extracted from the (old) track log associated with the previous backup image. In such an embodiment, the fingerprint and segment attributes of each file segment can be stored in a new entry that is appended to the end of the new track log. The process of FIG. 7A then ends.

FIG. 7B is a flow chart illustrating an example transmission sub-process for changed file data, implemented by an efficient backup client module 150 (e.g., such as cooperatively implemented by fingerprint generation module 220 and transmit module 230 of efficient backup client module 150). The process starts at operation 730, where client module 150 generates a fingerprint for changed file data (e.g., a fingerprint for file F(i) or for file segment S(j)). The process continues to operation 735, where client module 150 stores a fingerprint and attributes of the changed file data (e.g., stores a fingerprint and file attributes for file F(i), or stores a fingerprint and segment attributes for file segment S(j)) in the new track log associated with the present backup image. In one embodiment, a fingerprint and file attributes of file F(i) can be appended as a new entry to the end of the new track log. In another embodiment, a fingerprint and segment attributes of file segment S(j) can be appended as a new entry to the end of the new track log.

The process then continues to operation 740, where client module 150 generates a data header for changed file data (e.g., file F(i) or file segment S(j)). The process then continues to operation 745, where client module 150 sends the data header and the changed file data (e.g., file F(i) or file segment S(j)) to the backup server. The data header can optionally include the generated fingerprint (e.g., fingerprint for file F(i) or for file segment S(j)). The process of FIG. 7B then ends.

Figure 8:
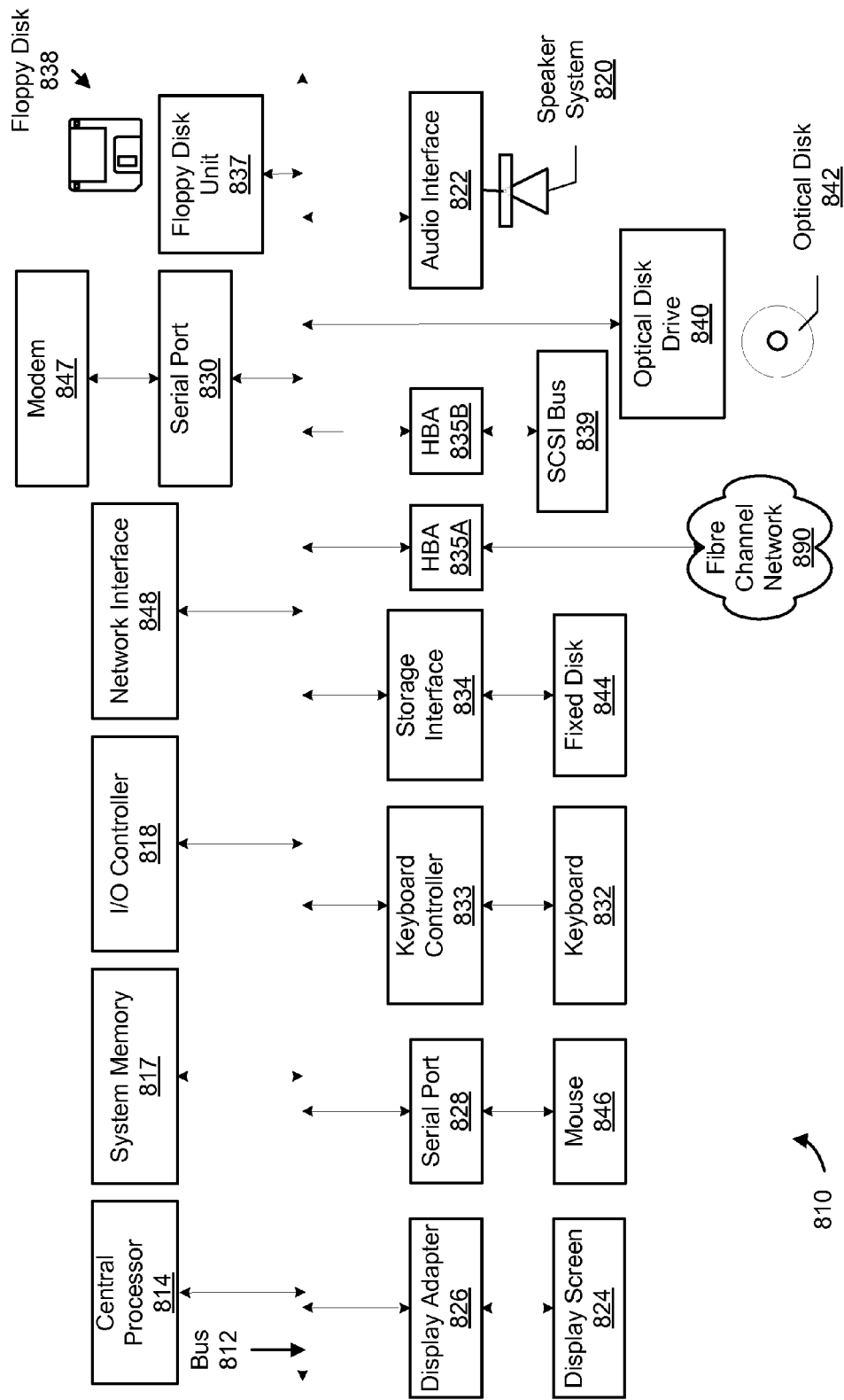
FIG. 8 is a simplified block diagram illustrating components of an example computer system suitable for implementing embodiments of the present disclosure, according to one embodiment.

FIG. 8 is a simplified block diagram that illustrates components of an example computer system 810 that is suitable for implementing the present disclosure. Computer system 810 may be illustrative of various computer systems in the backup system 100, such as system(s) 110, 130, and/or 140, among others. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. Code for the automatically performing operations on such applications based on their dependencies on other applications (such as described above with reference to the process of FIG. 6-7), etc., to implement the present disclosure can be stored in computer-readable storage media such as one or more of system memory 817, fixed disk 844, optical disk 842, or floppy disk 838. Memory 817 is also used for storing temporary variables or other intermediate information during the execution of instructions by the processor 814. The operating system provided on computer system 810 may be MS-DOS®, MS-WINDOWS®, OS/2®, UNIX®, Linux®, or another known operating system.

Moreover, regarding the signals described herein, it will be understood that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
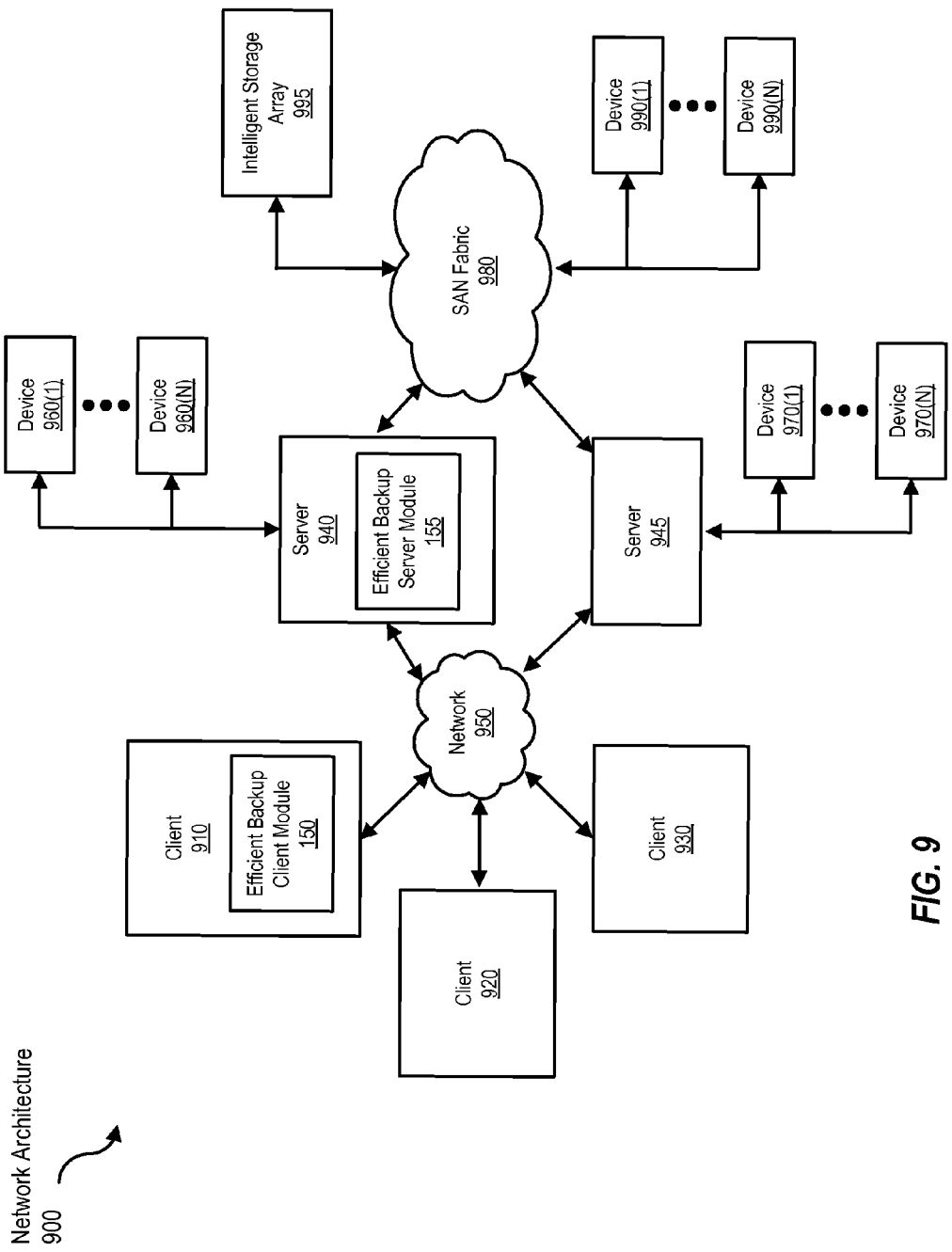
FIG. 9 is a simplified block diagram illustrating components of an example computer system suitable for implementing embodiments of the present disclosure, according to one embodiment.

FIG. 9 is a simplified block diagram illustrating components of an example computer system suitable for implementing embodiments of the present disclosure. FIG. 9 illustrates a network system 900 in which client systems 910, 920 and 930 and servers 940, and 945 can be coupled to a network 950. Client systems 910, 920 and 930 generally represent any type or form of computing device or system, such as client systems 110 in FIG. 1 or computer system 810 in FIG. 8.

Similarly, servers 940 and 945 generally represent computing devices or systems, such as application servers or database servers, configured to provide various database services and/or run certain software applications, such as backup server 140 in FIG. 1 or computer system 810 in FIG. 8. Network 950 generally represents any telecommunication or computer network including, for example, an intranet, a wide area network (WAN), a local area network (LAN), a personal area network (PAN), or the Internet. In one example, client systems 910, 920 and/or 930 can include an efficient backup client module 150, as shown in FIGS. 1 and 2, and/or servers 940 and/or 945 can include an efficient backup server module 155, as shown in FIGS. 1 and 3.

As illustrated in FIG. 9, one or more storage devices 960 (1)-(N) can be directly attached to server 940. Similarly, one or more storage devices 970(1)-(N) can be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) can represent network-attached storage (NAS) devices configured to communicate with servers 940 and 945 using various protocols, such as Network File System (NFS), Server Message Block (SMB), or Common Internet File System (CIFS).

Servers 940 and 945 can also be connected to a storage area network (SAN) fabric 980. SAN fabric 980 generally represents any type or form of computer network or architecture capable of facilitating communication between multiple storage devices. SAN fabric 980 can facilitate communication between servers 940 and 945 and a plurality of storage devices 990(1)-(N) and/or an intelligent storage array 995. SAN fabric 980 can also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to computer system 810 of FIG. 8, a communication interface can be used to provide connectivity between each client system 920 and 930 and network 950. Client systems 910, 920 and 930 can be able to access information on server 940 or 945 using, for example, a web browser or other client software. Such software can allow client systems 910, 920 and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the embodiments disclosed herein can be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the embodiments disclosed herein can also be encoded as a computer program, stored in and run by server 940 and server 945, and distributed to client systems 910, 920 and 930 over network 950.

In some examples, all or a portion of the computing devices in FIGS. 1, 8, and 9 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In addition, one or more of the components described herein can transform data, physical devices, and/or representations of physical devices from one form to another. For example, an efficient backup server module 155 in FIG. 1 can transform information received from a client system into a new backup image.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A non-transitory computer readable storage medium configured to store program instructions that, when executed on a processor, are configured to cause the processor to perform a method comprising:
receiving data at a backup server, wherein the data comprises a header;
determining whether the header comprises a metadata header; and
in response to a determination that the header comprises the metadata header,
extracting metadata from the metadata header, wherein the metadata identifies unchanged file data in a previous backup image,
extracting a copy of the unchanged file data from the previous backup image, using the metadata, and
writing the copy of the unchanged file data to a present backup image.

2. The non-transitory computer readable storage medium of claim 1, wherein the method further comprises:
in response to a determination that the header does not comprise the metadata header,
writing changed file data associated with the header to the present backup image, wherein
the data comprises the changed file data.

3. The non-transitory computer readable storage medium of claim 1, wherein
the extracting the copy of the unchanged file data further comprises
identifying the previous backup image using a backup image identifier extracted from the metadata header.

4. The non-transitory computer readable storage medium of claim 1, wherein the method further comprises:
verifying integrity of the copy of the unchanged file data using a first fingerprint extracted from the metadata header.

5. The non-transitory computer readable storage medium of claim 4, wherein
the verifying integrity comprises
generating a second fingerprint of the copy of the unchanged file data, and
determining whether the second fingerprint matches the first fingerprint.

6. The non-transitory computer readable storage medium of claim 1, wherein
the metadata comprises a location of the unchanged file data in the previous backup image.

7. The non-transitory computer readable storage medium of claim 1, wherein
the present backup image is a full backup image.

8. A method comprising:
receiving data at a backup server, wherein the data comprises a header;
determining whether the header comprises a metadata header; and
in response to a determination that the header comprises the metadata header,
extracting metadata from the metadata header, wherein the metadata identifies unchanged file data in a previous backup image,
extracting a copy of the unchanged file data from the previous backup image, using the metadata, and
writing the copy of the unchanged file data to a present backup image.

9. The method of claim 8, further comprising:
in response to a determination that the header does not comprise the metadata header,
writing changed file data associated with the header to the present backup image, wherein
the data comprises the changed file data.

10. The method of claim 8, wherein
the extracting the copy of the unchanged file data further comprises
identifying the previous backup image using a backup image identifier extracted from the metadata header.

11. The method of claim 8, wherein the method further comprises:
verifying integrity of the copy of the unchanged file data using a first fingerprint extracted from the metadata header.

12. The method of claim 11, wherein
the verifying integrity comprises
generating a second fingerprint of the copy of the unchanged file data, and
determining whether the second fingerprint matches the first fingerprint.

13. The method of claim 8, wherein
the metadata comprises a location of the unchanged file data in the previous backup image.

14. The method of claim 8, wherein
the present backup image is a full backup image.

15. A computing device comprising:
a processor; and
a memory coupled to the processor and configured to store instructions executable by the processor, the instructions configured to implement
a backup server module configured to
receive data, wherein the data comprises a header,
an analysis module configured to
determine whether the header comprises a metadata header,
extract metadata from the metadata header, in response to a determination that the header comprises the metadata header, wherein
the metadata identifies unchanged file data in a previous backup image, and
a transmit module configured to
extract a copy of the unchanged file data from the previous backup image, using the metadata, and
write the copy of the unchanged file data to a present backup image.

16. The computing device of claim 15, wherein the transmit module is further configured to:
write changed file data associated with the header to the present backup image, in response to a determination that the header does not comprise the metadata header, wherein the data comprises the changed file data.

17. The computing device of claim 15, wherein the transmit module is further configured to:
identify the previous backup image using a backup image identifier extracted from the metadata header.

18. The computing device of claim 15, wherein the instructions are further configured to implement:
a fingerprint generation module configured to
verify integrity of the copy of the unchanged file data using a first fingerprint extracted from the metadata header.

19. The computing device of claim 18, wherein the fingerprint generation module is further configured to:
  generate a second fingerprint of the copy of the unchanged file data, and
  determine whether the second fingerprint matches the first fingerprint.

20. The computing device of claim 15, wherein
  the metadata comprises a location of the unchanged file data in the previous backup image.

* * * * *